(12) United States Patent
Yamamoto et al.

(10) Patent No.: US 6,203,293 B1
(45) Date of Patent: Mar. 20, 2001

(54) ELECTRIC FAN APPARATUS, CONNECTOR CONNECTION STRUCTURE, AND INTERMEDIATE TERMINAL

(75) Inventors: Yoshiji Yamamoto; Hideo Ishiguro, both of Toyohashi; Akitada Katou, Nagoya; Masanobu Gotou, Kariya; Jyunji Sugiura, Toyota; Yasunobu Hirao, Toyokawa; Akiyoshi Yasunobe, Kosai; Masatoshi Niigawa, Aichi-ken, all of (JP)

(73) Assignees: ASMO Co., Ltd.; Denso Corporation, both of (JP)

( * ) Notice: Subject to any disclaimer, the term of this patent is extended or adjusted under 35 U.S.C. 154(b) by 0 days.

(21) Appl. No.: 09/089,341

(22) Filed: Jun. 3, 1998

(30) Foreign Application Priority Data

Jun. 4, 1997 (JP) .................................................. 9-146773

(51) Int. Cl.⁷ .............................. F04B 17/00; F04B 35/04
(52) U.S. Cl. .................................... 417/423.1; 417/423.7; 123/41.44; 165/121
(58) Field of Search ............................ 62/298; 339/94 R; 439/209, 380, 421, 188, 489, 595, 76.2, 585, 651, 752.5; 123/41.11, 41.44; 165/121; 417/423.1, 423.7; 310/220

(56) References Cited

U.S. PATENT DOCUMENTS

| | | | |
|---|---|---|---|
| 3,771,321 | * 11/1973 | Maksy ............................... | 62/298 |
| 4,311,355 | * 1/1982 | Plyer ................................. | 339/94 R |
| 4,441,462 | * 4/1984 | Budlinski ......................... | 123/41.11 |
| 4,685,513 | * 8/1987 | Longhouse ....................... | 165/121 |
| 4,727,274 | 2/1988 | Adam . | |
| 4,834,629 | * 5/1989 | Tateishi ............................ | 417/423.1 |
| 4,875,871 | * 10/1989 | Booty, Sr. et al. ............... | 439/209 |
| 4,891,017 | * 1/1990 | Kuhn et al. ...................... | 439/380 |
| 4,955,816 | * 9/1990 | Roberts et al. .................. | 439/421 |
| 5,176,509 | * 1/1993 | Schmider et al. ................ | 417/423.7 |
| 5,370,543 | * 12/1994 | Hamada et al. .................. | 439/188 |
| 5,571,030 | * 11/1996 | Gladd et al. ..................... | 439/489 |
| 5,575,683 | * 11/1996 | Saito et al. ...................... | 439/595 |
| 5,660,149 | * 8/1997 | Lakerdas et al. ................ | 123/41.44 |
| 5,759,050 | * 6/1998 | Matsouka et al. ............... | 439/76.2 |
| 5,823,824 | * 10/1998 | Mitamura et al. ............... | 439/585 |
| 5,899,773 | * 5/1999 | Cheng .............................. | 439/651 |
| 5,949,173 | * 9/1999 | Wille et al. ...................... | 310/220 |
| 5,993,268 | * 11/1999 | Yamaguchi ...................... | 439/752.5 |

FOREIGN PATENT DOCUMENTS

| | | |
|---|---|---|
| 08296524A | 11/1996 | (JP) . |
| 08312488A | 11/1996 | (JP) . |
| 09261915A | 10/1997 | (JP) . |

* cited by examiner

Primary Examiner—Teresa Walberg
Assistant Examiner—Leonid Fastovsky
(74) Attorney, Agent, or Firm—Kilpatrick Stockton LLP (57) ABSTRACT

An electric fan apparatus including connectors that employ male terminals. Intermediate terminals are employed to connect the male terminals of the connectors. A fan motor is located behind a radiator to rotate a fan for producing air flow that cools the radiator. A controller controls the fan motor. A socket connector is provided on the fan motor or the controller. The socket connector has a sink for accommodating a male terminal. A plug connector is provided for engagement with the socket connector. The plug connector also has a sink for accommodating a male terminal. An intermediate terminal electrically connects the socket connector male terminal and the plug connector male terminal when the socket connector and the plug connector are engaged with each other. The intermediate terminal has back-to-back female ends that are fitted onto the male terminals to bridge the male terminals.

20 Claims, 8 Drawing Sheets

ELECTRIC FAN APPARATUS, CONNECTOR CONNECTION STRUCTURE, AND INTERMEDIATE TERMINAL

BACKGROUND OF THE INVENTION

The present invention relates to electric fan apparatuses, connector connection structures, and intermediate terminals. More particularly, the present invention relates to fan motors used for cooling automobile radiators and cooler condensers.

An automobile engine is typically cooled by a radiator. The radiator is cooled by an electric fan apparatus located near the radiator. The electric fan apparatus includes a fan and a motor for driving the fan. The electric fan apparatus rotates the fan to produce a flow of air for cooling the radiator when the cooling of the radiator becomes insufficient.

The optimal volume of air for cooling the radiator is determined in accordance with the state of the radiator. Therefore, a controller is provided to control the fan motor and adjust the rotating speed of the fan to produce the optimal volume of air.

When assembling the electric fan apparatus, the controller is electrically connected to the fan motor by wires before assembling the motor. The electrically connected portion of the controller and the fan motor must not be exposed to prevent short circuits that may be caused by contact with liquids such as water. However, it is difficult and thus burdensome to connect the controller to the fan motor with wires.

The controller may be connected to the fan motor using a connector instead of the wires. In such case, a plug connector may be provided for the controller and a socket connector may be provided with the fan motor to receive the plug connector. Since the connectors are insert molded, female terminals, which have complicated shapes, are not used. In other words, the plug and socket connectors both employ male terminals. Accordingly, it is necessary that the connectors of the controller and the fan motor can be connected to each other even if both connectors have male terminals.

SUMMARY OF THE INVENTION

Accordingly, it is an objective of the present invention to provide an electric fan apparatus, a connector connection structure, and an intermediate terminal that simplifies the electric connection of connectors having male terminals.

To achieve the above objective, the present invention provides an electric fan apparatus comprising: a fan motor located next to a radiator to rotate a fan for producing air flow that cools the radiator; a controller for controlling the fan motor; a socket connector provided on either one of the fan motor and the controller, the socket connector having a sink for accommodating a male terminal; a plug connector provided on the other one of the fan motor and the controller for engagement with the socket connector, the plug connector having a sink for accommodating a male terminal; and an intermediate terminal for electrically connecting the socket connector male terminal and the plug connector male terminal when the socket connector and the plug connector are engaged with each other, wherein the intermediate terminal has a first female end that is fitted into the male terminal of either one of the connectors and a second female end that is fitted into the male terminal of the other connector.

The present invention further provides a connector connection structure comprising: a socket connector having a sink for accommodating a male terminal; a plug connector for engagement with the socket connector, the plug connector having a sink for accommodating a male terminal; and an intermediate terminal for electrically connecting the socket connector male terminal and the plug connector male terminal when the socket connector and the plug connector are engaged with each other, wherein the intermediate terminal has a first female end that is fitted into the male terminal of either one of the connectors and a second female end that is fitted into the male terminal of the other connector.

The present invention provides an intermediate terminal comprising: female terminal ends each defined by channels, the channels being formed by bending the sides of a metal plate inwardly; a slit extending transversely across each channel to divide the channel into independent sections; and a guide defined on any one of the female ends, the guide being inclined such that the guide serves to direct a male terminal into the corresponding female end.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
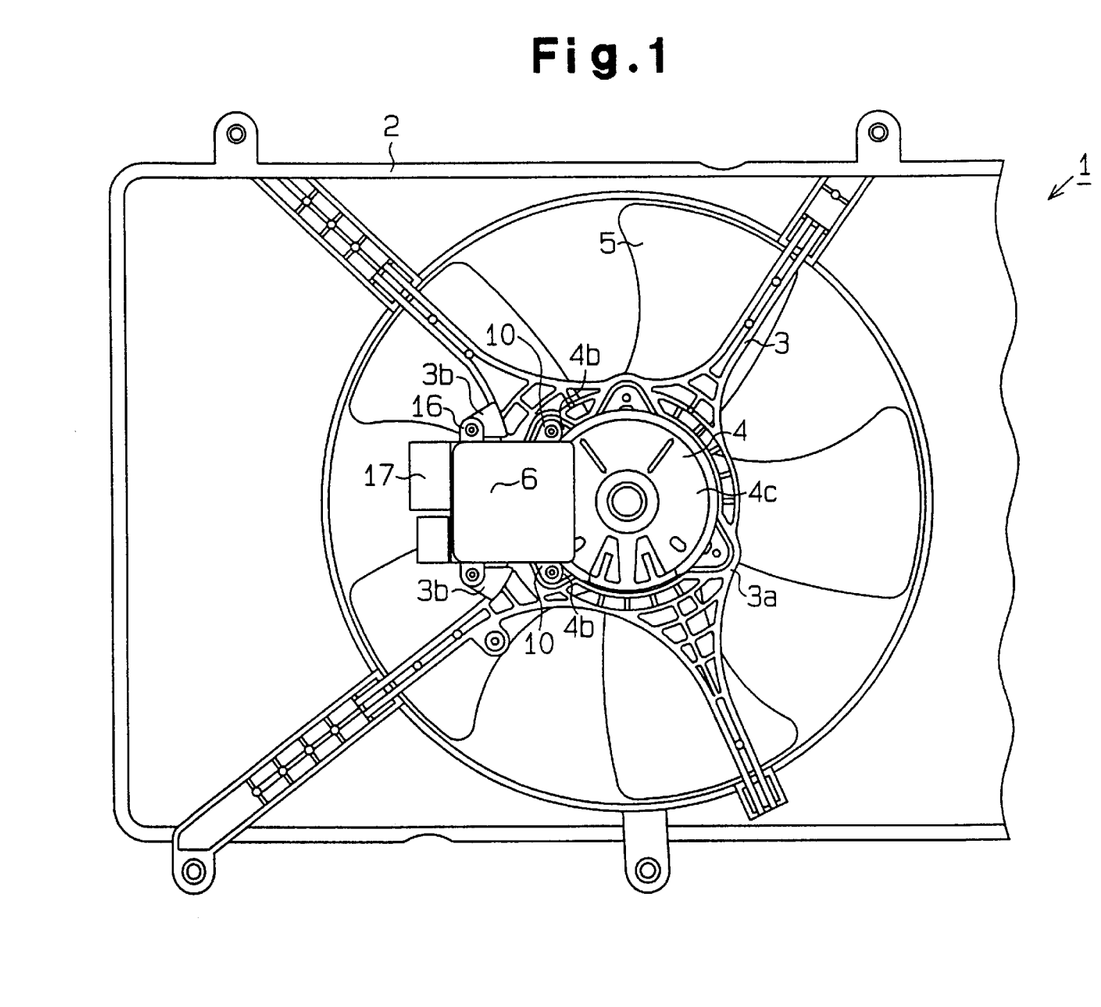
FIG. 1 is a rear view showing a first embodiment of an electric fan apparatus according to the present invention.

A first embodiment of an electric fan apparatus according to the present invention will now be described with reference to FIGS. 1 to 4. As shown in FIG. 1, an electric fan apparatus 1 includes a fan 5 for cooling a radiator 2, a fan motor 4 for driving the fan 5, and a controller 6 for controlling the fan motor 4. FIG. 1 shows the rear side of the fan motor 4.

A support 3 having a holder 3a is arranged behind the radiator 2. The fan motor 4, which is generally cylindrical, is fixed to the holder 3a by bolts (not shown). The fan motor 4 has a rotary shaft (not shown) on which the fan 5 is fixed. The controller 6 is located beside the fan motor 4. The support 3 has two support tabs 3b. The fan motor 4 includes a case 4a from which two support tabs 4b extend. The support tabs 3b, 4b are used to support the controller 6.

Figure 2:
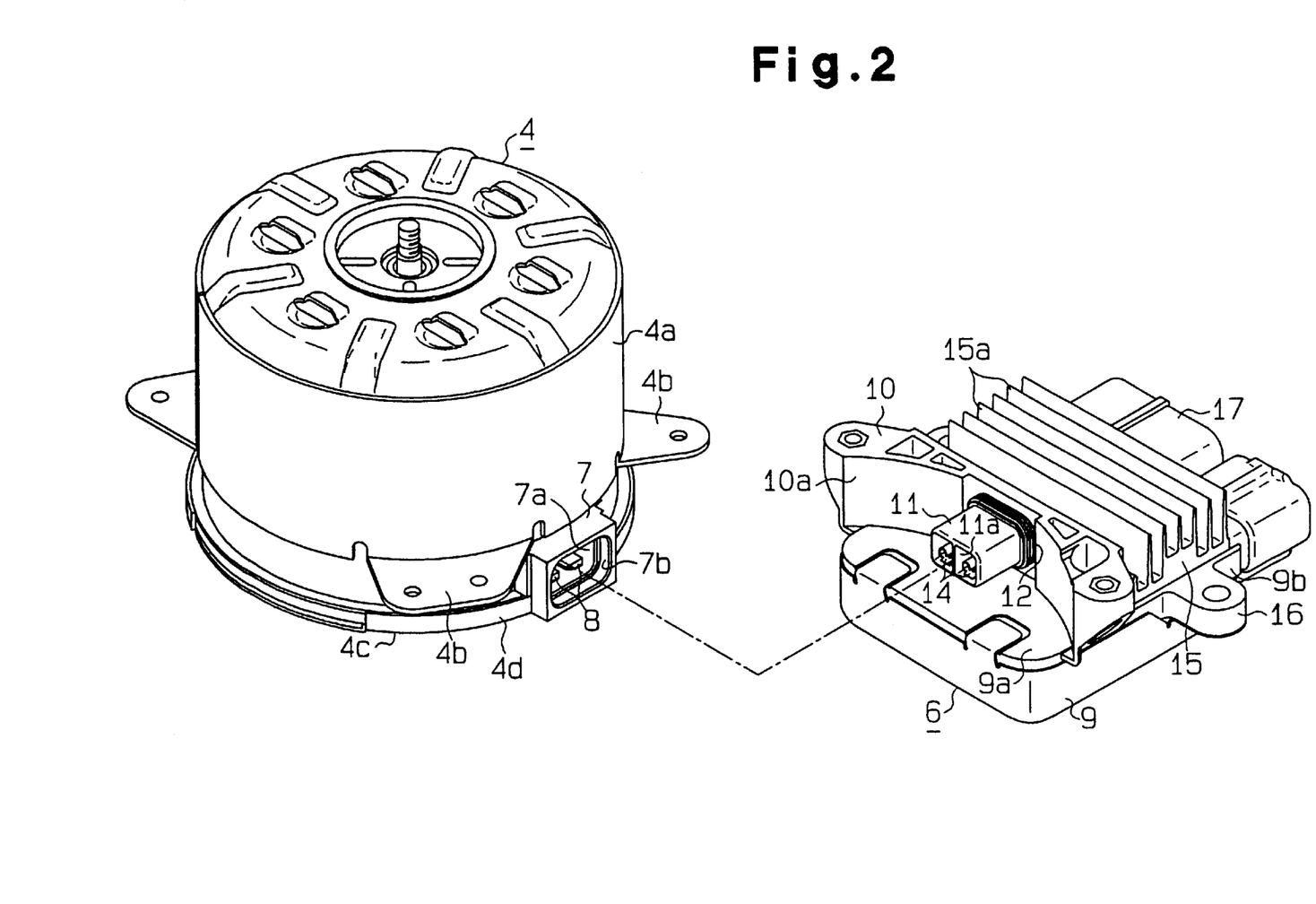
FIG. 2 is a perspective view showing the connectors of the fan motor and the controller of FIG. 1.
Figure 3:
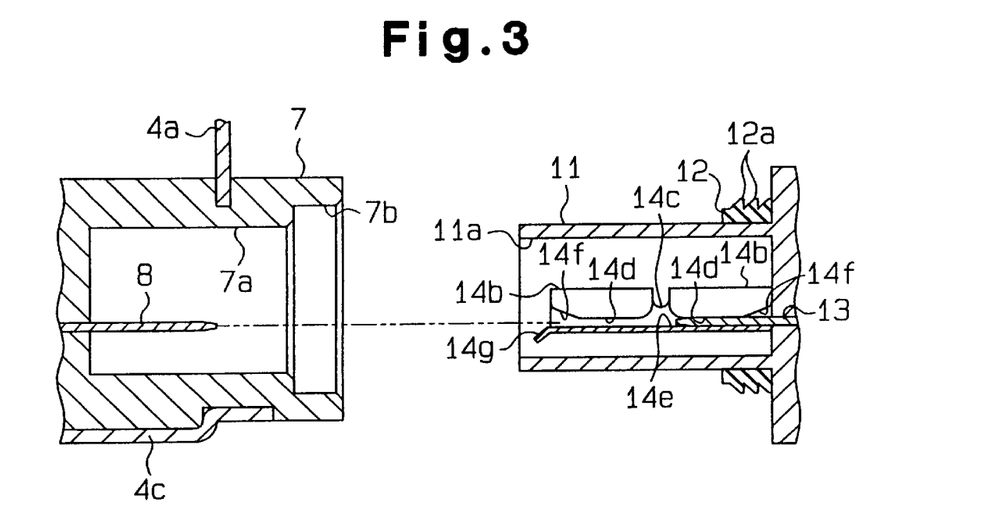
FIG. 3 is a cross-sectional view showing the connectors of FIG. 2.

As shown in FIG. 2, in addition to the case 4a, the fan motor 4 includes a cap 4c, and a socket connector 7. The socket connector 7, which is used to electrically connect the fan motor 4 to the controller 6, is held between the case 4a and the cap 4c such that the connector 7 projects laterally. The socket connector 7 is generally box-like and has a sink 7a. Two male terminals 8 are accommodated in the sink 7a. As described in the "BACKGROUND OF THE INVENTION," electric devices installed in automobiles usually employ connectors having male terminals. As shown in FIG. 3, the socket connector 7 has a stepped portion 7b defined adjacent to the opening of the sink 7a. The cross-sectional area of the stepped portion 7b is greater than that of the sink 7a.

The controller 6 includes a box-like body 9, a coupling portion 10, a plug connector 11, and a heat exchange plate 15. The coupling portion 10 is arranged in correspondence with the support tabs 4b extending from the motor case 4a. The coupling portion 10 has an arched surface 10a, which contacts the cylindrical surface 4d of the motor cap 4c. The body 9 has a front surface 9a that comes into contact with the lower surface of the cap 4c when connecting the controller 6 to the motor 4.

The plug connector 11, which is generally box-like and received by the socket connector 7, is located at the middle of the arched surface 10a. A frame-like rubber packing 12 is arranged about the basal outer surface of the plug connector 11. As shown in FIG. 3, lips 12a extend along the peripheral surface of the packing 12. Thus, when the plug connector 11 is engaged with the socket connector 7, the packing 12 is accommodated in the stepped portion 7b. In this state, the lips 12a are pressed against the wall of the stepped portion thereby sealing the connectors 7, 11. This prevents the entry of liquids into the connectors 7, 11.

The plug connector 11 has a sink 11a in which two male terminals 13 are accommodated. The plug connector 11 is insert molded. As described above, the plug connector 11 may employ female terminals that are connected to the male terminals 8 of the socket connector 7. However, such female terminals are not appropriate for insert molding. Therefore, male terminals 13 are employed in the plug connector 11.

As shown in FIG. 2, the heat exchange plate 15 is fixed to the front surface 9a of the body 9 adjacent to the coupling portion 10. The heat exchange plate 15 has fins 15a extending perpendicular to the front surface 9a. The fins 15a are cooled by the flow of air produced by the rotation of the fan 5. This effectively cools the electronic components accommodated in the body 9. Coupling plates 16 extend laterally from the side wall 9b of the body 9 in correspondence with the support tabs 3b of the support 3. The coupling portion 10 and the coupling plates 16 are not necessary if the controller can be securely fixed to the motor 4.

Although not shown in the drawings, a plurality of electronic components are accommodated in the body 9. Components that tend to heat easily are arranged near the heat exchange plate 15 while other components are arranged at locations that are not much affected by the air flow produced by the fan 5 (such as the portion opposite from the fan 5 located adjacent to the coupling portion). This structure minimizes the length of the controller 6 extending from the fan motor 4. Furthermore, the heat exchange plate 15 efficiently cools the components that heat easily. The reduced length of the controller 6 suppresses noise that is produced as air passes by the controller 6.

The controller 6 further includes a power supply connector 17. Electric power is fed to the controller 6 through the power supply connector 17 from an electric power source of the automobile so that the controller 6 can control the fan motor 4.

Figure 4:
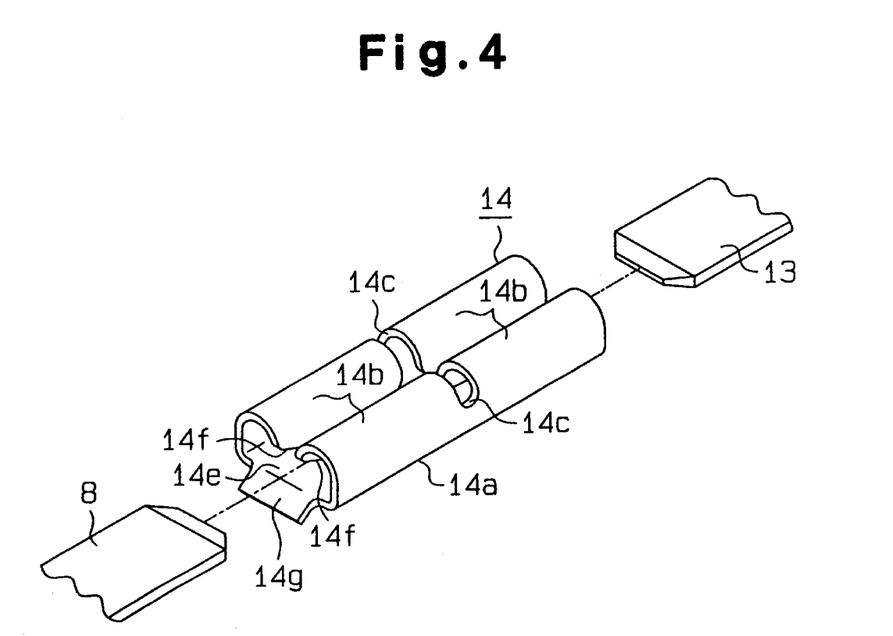
FIG. 4 is a perspective view showing an intermediate terminal.

As shown in FIGS. 3 and 4, an intermediate terminal 14 is used to connect each male terminal 8 of the socket connector 7 to the associated male terminal 13 of the plug connector 11. The intermediate terminal 14 includes a metal plate 14a, which is bent on each side to define parallel U-shaped channels 14b. Accordingly, the intermediate terminal 14 is formed to function as a female-female terminal. A slit 14c extends across the longitudinally middle section of the channels 14b.

The metal plate 14a has a flat portion 14e and engagement ends 14d, which face toward the upper surface of the flat portion 14e (FIG. 3). A gap is formed between each engagement end 14d and the flat portion 14e to receive the terminals 8, 13. Each gap is slightly narrower than the thickness of the male terminals 8, 13. When each terminal 8, 13 is inserted into the gap, the channels 14b are flexed. Thus, the elastic force produced by the channels 14b securely clamps the terminal 8, 13 in the intermediate terminal 14. The slit 14c divides the channels 14b at their longitudinally middle section. Therefore, when inserting the associated terminals 8, 13 into the intermediate terminal 14, the channels 14b of the terminal 8 and the channels 14b of the terminal 13 do not affect each other.

Each engagement end 14d of the metal plate 14a includes a tapered section 14f. One end of the flat portion 14e (the end to the left as viewed in FIG. 4) is bent downward to define a guide 14g. Therefore, the male terminals 8, 13 are guided by the tapered sections 14f and the guide 14g during insertion. Accordingly, the tapered sections 14f and the guide 14g facilitate the insertion of the terminals 8, 13 and accommodate relative height differences between the associated terminals 8, 13.

To secure the controller 6 and the fan motor 4 to the support 3, each male terminal 13 of the plug connector 11 is engaged with an intermediate terminal 14. The end of the intermediate terminal 14 not having the guide 14g is fitted on the male terminal 13, as shown in FIG. 3. The plug connector 11 and the intermediate terminals 14 are then plugged into the socket connector 7. The male terminals 8 of the socket connector 7 are guided into the gap between the engagement ends 14d and the flat portion 14e of the associated intermediate terminal 14 by the tapered sections 14f and the guide 14g.

The engagement between the plug connector 11 and the socket connector 7 electrically connects the fan motor 4 and the controller 6 by way of the male terminals 8, 13 and the intermediate terminals 14. The fan motor 4 and the controller 6 are easily connected to each other due to employment of the intermediate terminals 14. The employment of the intermediate terminals 14 also eliminates complicated wire connections. Furthermore, when the plug connector 11 and the socket connector 7 are connected to each other, the lips 12a of the packing 12 come into contact with the stepped portion 7b and seal the connectors 7, 11. The packing 12 prevents exposure of the connectors 7, 11 to liquids.

When the connectors 7, 11 are engaged with each other, the arched surface 10a of the coupling portion 10 is engaged with the cylindrical surface 4d of the motor cap 4c. In addition, the front surface 9a of the body 9 is engaged with the surface of the motor cap 4c. Accordingly, the controller 6 and the fan motor 4 are securely fixed to each other and resist loosening.

The coupling portion 10 of the controller 6 is fastened to the two support tabs 4b extending from the motor case 4a by screws. The fan motor 4 is then fastened to the holder 3a of the support 3 by screws. The coupling plates 16 of the controller 6 are then fixed to the associated support tabs 3b of the support 3 by bolts. This completes the attachment of the controller 6 and fan motor 4 to the support 3.

As described above, the employment of the intermediate terminal 14 in the electric fan apparatus 1 facilitates the connection between the socket connector 7 and the plug connector 11 regardless of the employment of the male terminals 8, 13 in the connectors 7, 11. The connecting structure thus simplifies the installation of the controller 6 to the fan motor 4.

A second embodiment of an electric fan apparatus according to the present invention will now be described with reference to FIGS. 5 to 8.

To avoid a redundant description, like or same reference numerals are given to those components that are like or the same as the corresponding components of the first embodiment.

Figure 5:
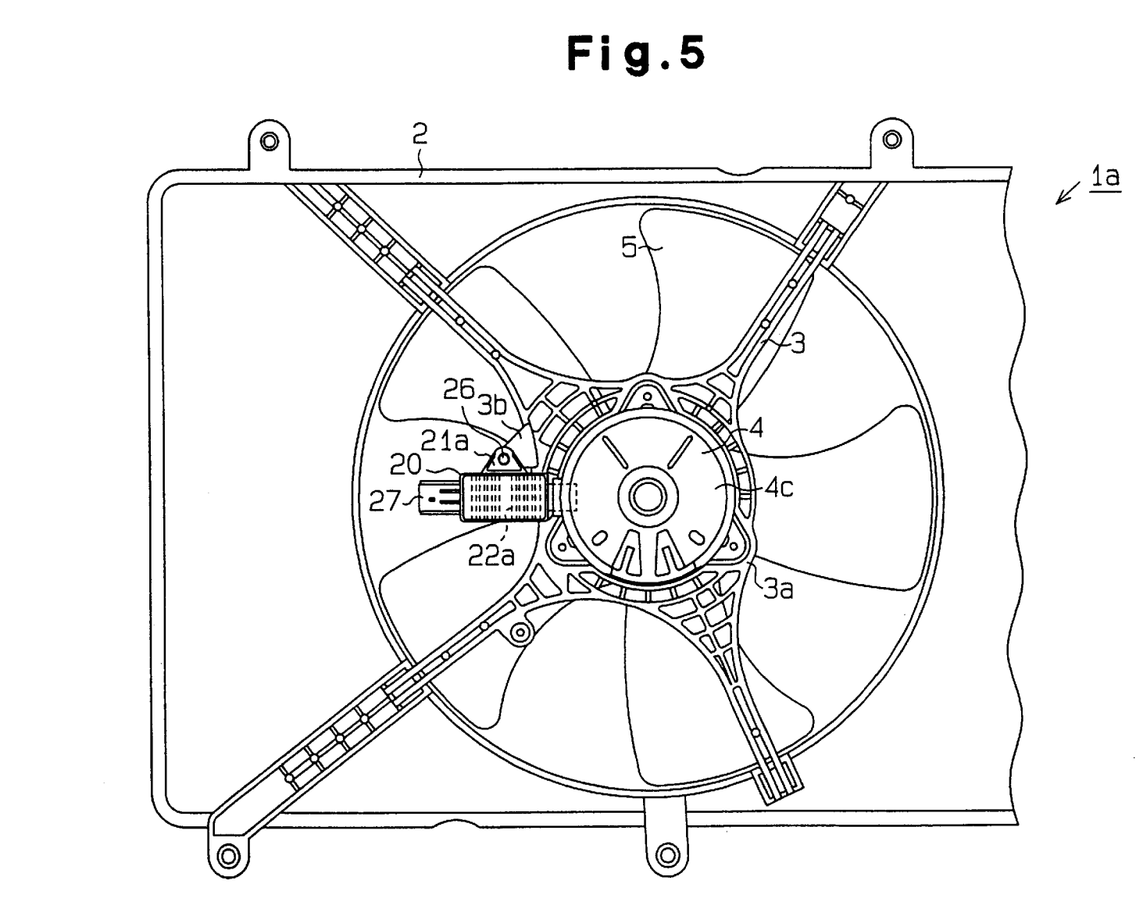
FIG. 5 is a rear view showing a second embodiment of an electric fan apparatus according to the present invention.

As shown in FIG. 5, an electric fan apparatus 1a has a controller 20, which extends horizontally from the fan motor 4 when secured to the support 3. The fan motor 4 is supplied with electric power through the controller 20. The controller 20 controls the rotating speed of the motor 4 so that a sudden flow of electric current does not temporarily decrease the power supply voltage when starting the motor 4.

A coupling plate 21a extends from the side wall of the controller 6. The coupling plate 21a is fastened to the support tab 3b of the support 3 by a bolt 26. The controller 20 is held by the socket connector 7 of the fan motor 4 and the support tab 3b. Accordingly, the vibration resistance of the portion supporting the controller 20 is improved. The coupling plate 21a may be eliminated if the controller 20 can be securely fixed to the fan motor 4.

Figure 6:
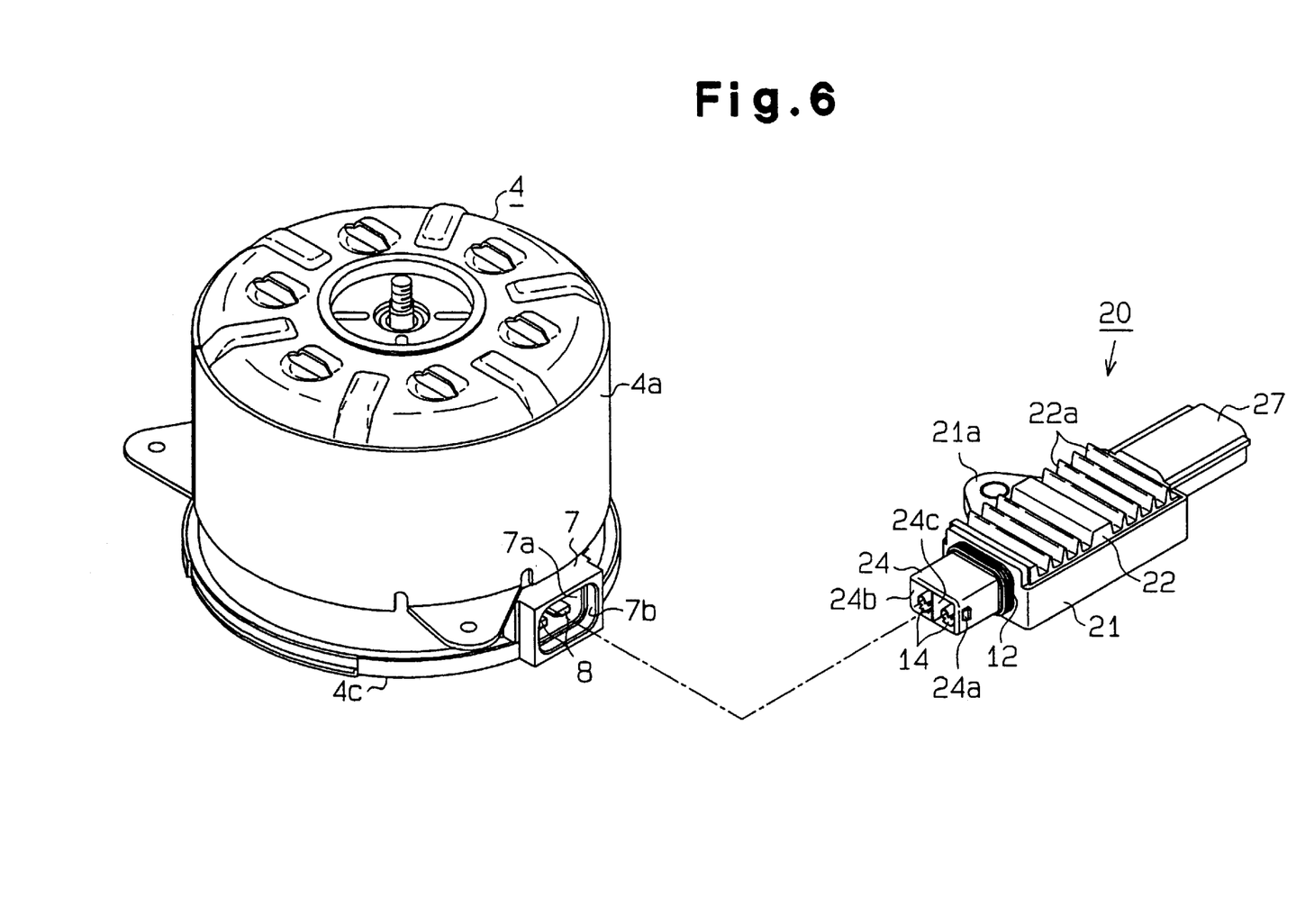
FIG. 6 is a perspective view showing the connectors of the fan motor and the controller of FIG. 5.
Figure 8:
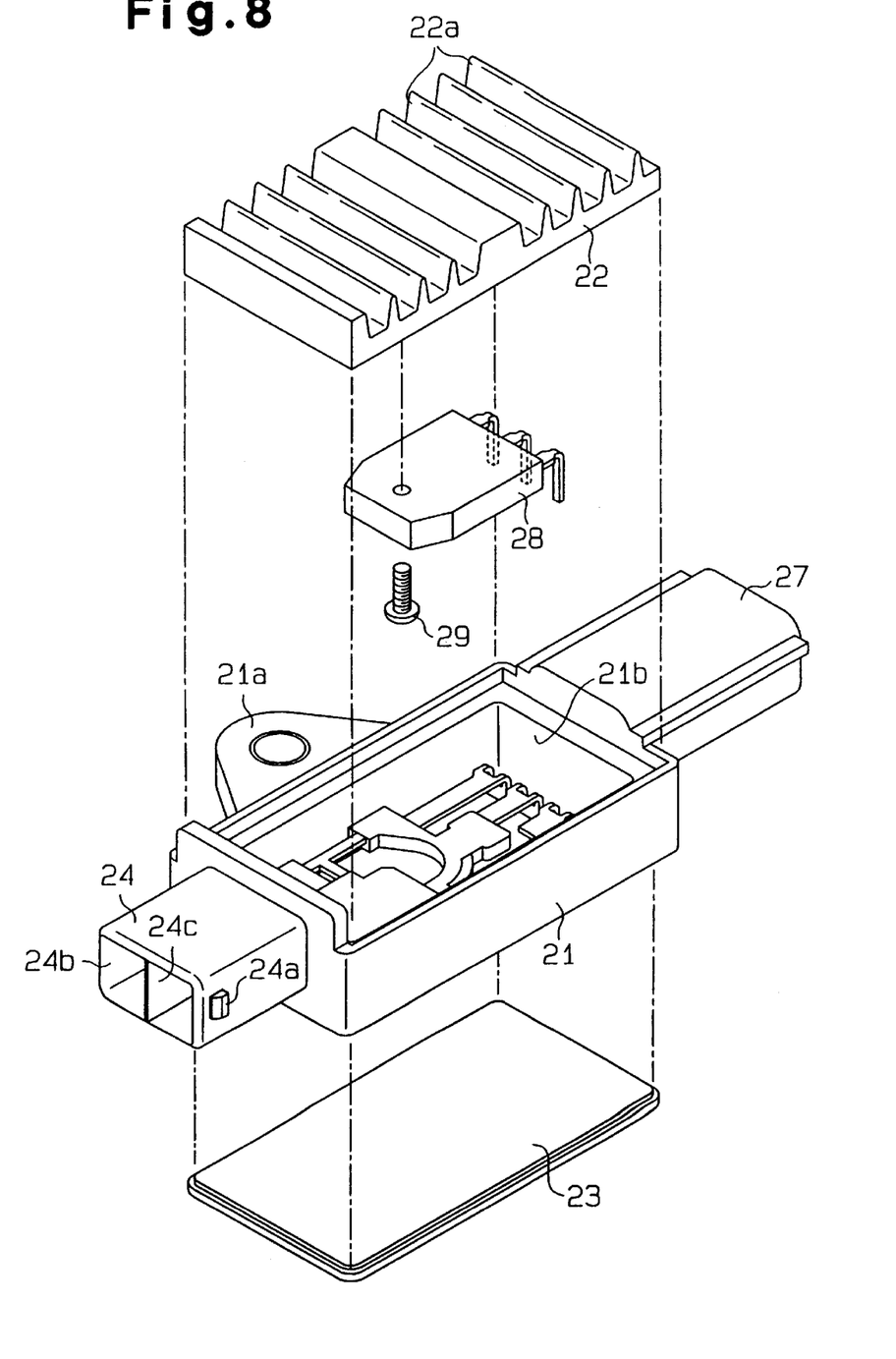
FIG. 8 is a perspective view showing the controller of FIG. 5.

As shown in FIGS. 6 and 8, the controller 20 includes a generally box-like body 21 made of synthetic resin having two openings. A heat exchange plate 22 is fixed to the controller 20 so as to close one of the openings. The other body opening is closed by a cover 23. The controller 20 also includes a plug connector 24, which is plugged into the socket connector 7 of the fan motor 4. A frame-like rubber packing 12 is arranged about the basal outer surface of the plug connector 24. Two projections 24a project from the outer surface of the plug connector 24.

Figure 7:
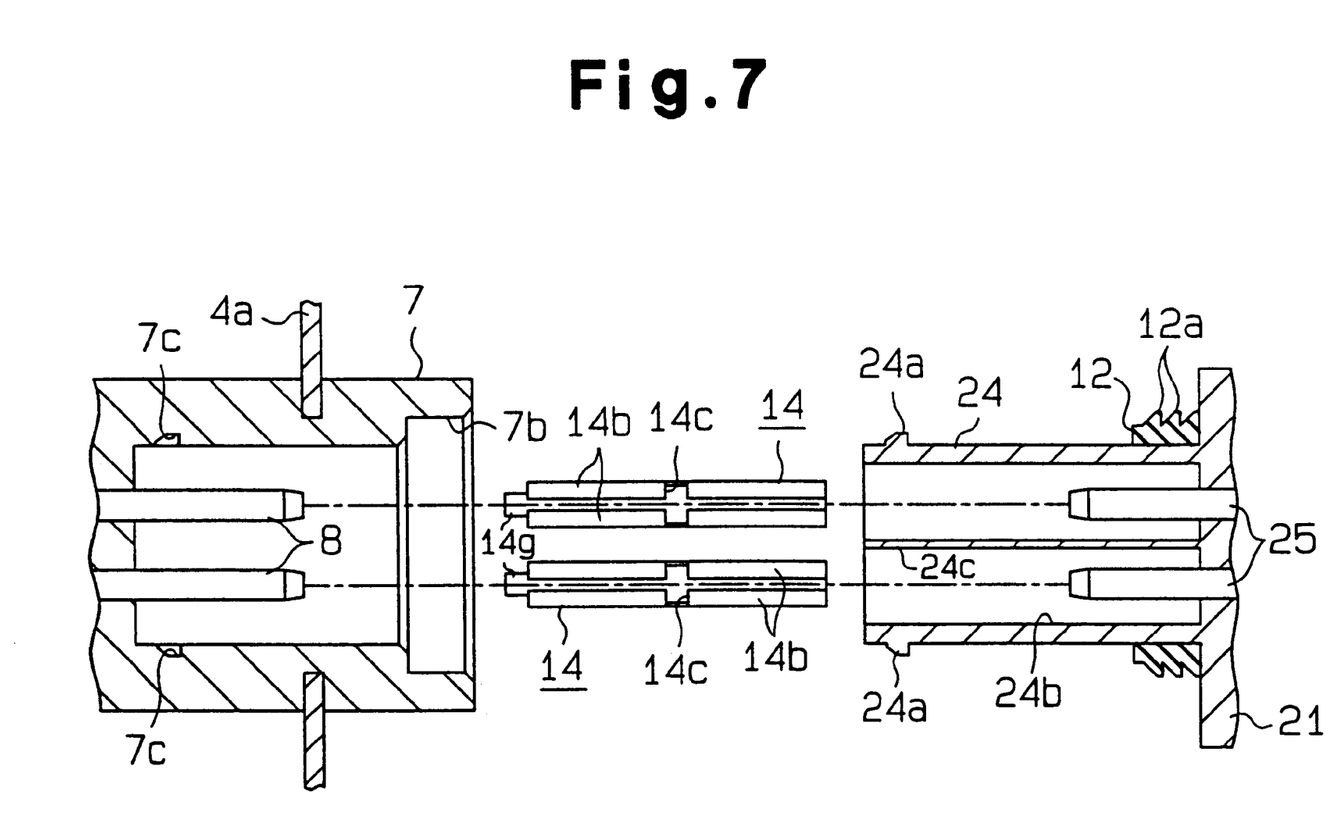
FIG. 7 is a cross-sectional view showing the connectors of FIG. 6.

As shown in FIG. 7, recesses 7c are provided on the walls of the socket connector sink 7a at positions corresponding to the projections 24a. When connecting the plug connector 24 and the socket connector 7 to each other, the projections 24a are received in the associated recesses 7c. The packing 12 is accommodated in the stepped portion 7b such that the lips 12a contact the walls of the stepped portion 7b and thereby seal the connectors 7, 24. Thus, the packing 12 prevents the entry of liquids into the connectors 7, 24. The elasticity of the packing 12 may produce a force acting in a direction that disengages the plug connector 24 from the socket connector 7. However, the engagement of the projections 24a with the recesses 7c prevents the plug connector 24 from falling out of the socket connector 7 and keeps the connectors 7, 24 in a sealed state. Locking devices other than the projections 24a and the recesses 7c may be employed as long as the plug connector 24 is prevented from falling out of the socket connector 7.

The plug connector 24 has a sink 24b that accommodates two male terminals 25. The male terminals 25 are insert molded. Each male terminal 25 is electrically connected with the associated male terminal 8 of the socket connector 7 by an intermediate terminal 14. A partition 24c separates the male terminals 25 from each other in the sink 24b. The partition 24c enhances the rigidity of the connector 24 and the vibration resistance of the connectors 7, 24. The shape of the partition 24c may be changed arbitrarily. The partition 24c may be eliminated if unnecessary.

As shown in FIG. 8, the controller 6 includes a power supply connector 27. Electric power is fed to the controller 6 through the power supply connector 27 from an electric power source of the automobile. The body 21 has an interior space 21b, which accommodates a control circuit. The control circuit includes electronic components, one of which is a transistor 28. The transistor 28 produces heat in the controller 20 and is thus fastened to the lower surface of the heat exchange plate 22 by a metal screw 29. The transistor 28 conducts heat to the heat exchange plate 22 directly and via the screw 29. Accordingly, heat conduction takes place efficiently between the transistor 28 and the heat exchange plate 22. In addition to the heat produced by the transistor 28, the screw 29 also conducts the heat produced in the interior space 21b. Therefore, the heat of the controller 20 is transferred efficiently.

Fins 22a are formed on the upper surface of the heat exchange plate 22 extending perpendicular to the upper surface. As shown in FIG. 5, the fins 22a are preferably arranged to extend vertically when the controller 20 and the fan motor 4 are assembled to the support 3. Natural convection air currents flow upward. Thus, the preferred arrangement of the fins 22a is optimal for natural convection. However, the fins 22a may be arranged to extend in an arbitrary direction.

The rotation of the fan 5 produces a flow of air that cools the fins 22a and the heat exchange plate 22 by forced convection. This efficiently cools the electronic components, especially the transistor 28, that are accommodated in the body 21. Therefore, the air flow efficiently cools the controller 20 by means of the heat exchange plate 22 and the fins 22a. Accordingly, damages to the controller 20 or malfunctions that are caused by heat are prevented.

Figure 9:
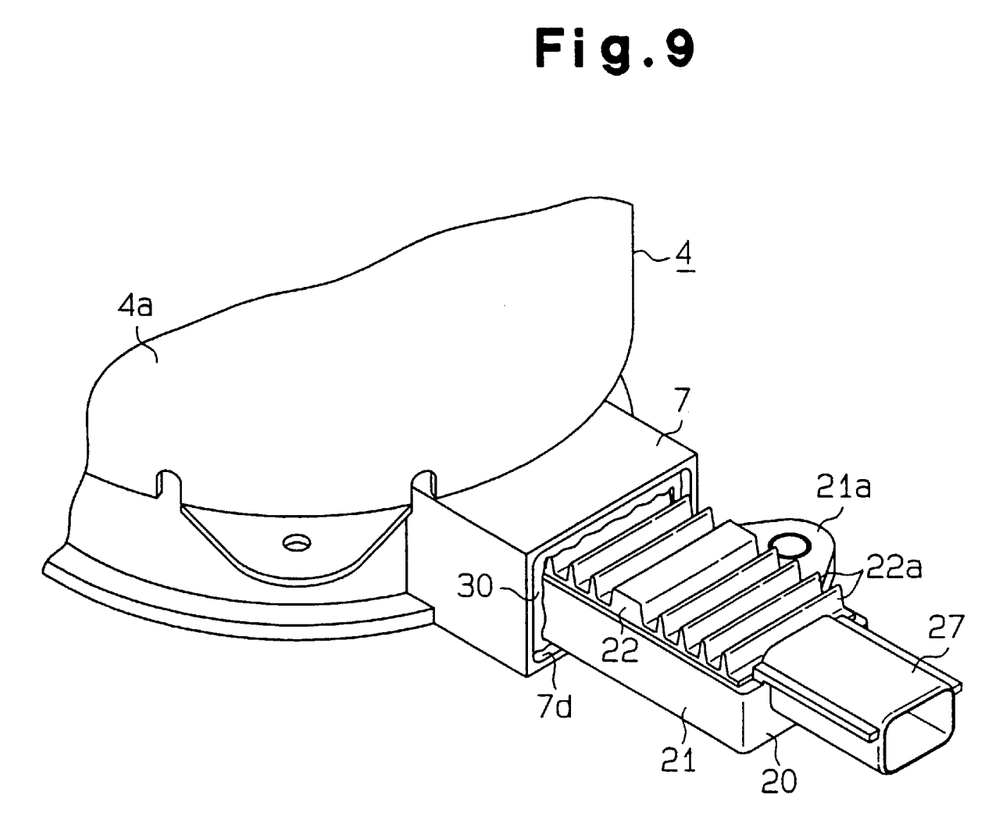
FIG. 9 is a perspective view showing the connectors of a fan motor and a controller employed in a further embodiment according to the present invention.

To prevent the entry of liquids into the connectors 7, 24, a repellant 30 may be used in lieu of the packing 12, as shown in FIG. 9. In such case, the socket connector 7 has a sink 7d for receiving the body 21 of the plug connector 24. After engaging the socket connector 7 with the plug connector 24, the repellant 30, which is a hot melt or the like, is applied to seal the gap between the socket connector 7 and the plug connector 24. This structure also prevents the entry of liquids into the connectors 7, 24.

It should be apparent to those skilled in the art that the present invention may be embodied in many other specific forms without departing from the spirit or scope of the invention. Particularly, it should be understood that the invention may be embodied in the following forms.

In each of the above embodiments, the packing 12 is arranged about the basal outer surface of the plug connectors 11 or 24. However, the packing 12 may be attached to the socket connector 7 instead. As another option, a packing 12 may be attached to both the socket connector 7 and the associated plug connector 11, 24. The material and shape of the packing 12 may also be changed as long as the packing 12 prevents the entry of liquids into the connectors 7, 11, 24.

In each of the above embodiments, the tapered sections 14f and the guide 14g may be eliminated from each intermediate terminal 14. As another option, the tapered sections 14f and the guide 14g may be provided together on only one end or on both ends of the intermediate terminal 14.

In each of the above embodiments, the plug connectors 11, 24 may be provided on the fan motor 4, and the socket connector 7 may be provided on the controllers 6, 20 instead. Furthermore, the connectors 7, 11, 24 and the intermediate terminals 14 may be used to connect devices other than the fan motor 4 and the controllers 6, 20.

Therefore, the present examples and embodiments are to be considered as illustrative and not restrictive and the invention is not to be limited to the details given herein, but may be modified within the scope and equivalence of the appended claims.

What is claimed is:

1. An electric fan apparatus comprising:
   a fan motor located next to a radiator to rotate a fan for producing air flow that cools the radiator;
   a controller for controlling the fan motor;
   a socket connector provided on either one of the fan motor and the controller, the socket connector having a sink for accommodating a male terminal;
   a plug connector provided on the other one of the fan motor and the controller for engagement with the socket connector, the plug connector having a sink for accommodating a male terminal; and
   an intermediate terminal for electrically connecting the socket connector male terminal and the plug connector male terminal when the socket connector and the plug connector are engaged with each other, wherein the intermediate terminal has a first female end that is fitted into the male terminal of either one of the connectors and a second female end that is fitted into the male terminal of the other connector.

2. The electric fan apparatus according to claim 1, wherein the sink of the socket connector has an inner wall, wherein the plug connector has an outer wall that contacts the inner wall, and wherein a seal is located between the inner wall and the outer wall.

3. The electric fan apparatus according to claim 2, wherein the seal is an elastic member that contacts the inner wall and the outer wall.

4. The electric fan apparatus according to claim 3, wherein a locking device is arranged between the socket connector and the plug connector, and wherein the locking device prevents disengagement of the plug connector from the socket connector.

5. The electric fan apparatus according to claim 4, wherein the socket connector inner wall includes a recess, and wherein the locking device includes a projection formed on the plug connector outer wall for engagement with the recess.

6. The electric fan apparatus according to claim 2, wherein the seal is a repellant applied between the socket connector inner wall and the plug connector outer wall.

7. The electric fan apparatus according to claim 1, wherein the intermediate terminal has a guide defined on at least one of its female ends, the guide being inclined such that the guide directs a male terminal towards a corresponding one of the female ends.

8. The electric fan apparatus according to claim 1, wherein the plug connector has a partitioning wall in its sink.

9. The electric fan apparatus according to claim 1, wherein the controller includes a coupling portion, the coupling portion being employed to support and fix the controller.

10. The electric fan apparatus according to claim 1, wherein the controller has a heat exchange portion for removing heat produced by the controller.

11. The electric fan apparatus according to claim 10, wherein the heat exchange portion includes a heat exchange plate exposed to the air flow produced by the fan, and a fin formed on the heat exchange plate.

12. The electric fan apparatus according to claim 11, wherein the fin extends in a direction other than the horizontal direction when the controller and the fan motor are arranged behind the radiator.

13. The electric fan apparatus according to claim 12, wherein the fin extends vertically.

14. The electric fan apparatus according to claim 10, wherein the controller has a body for accommodating a first electrical component that has a relatively high operating temperature, the first component being fixed to contact the heat exchange portion.

15. The electric fan apparatus according to claim 14, wherein a metal fastener fastens the first component to the heat exchange portion.

16. The electric fan apparatus according to claim 14, wherein the controller body further accommodates a second electrical component that remains relatively cool in operation, wherein the controller body further includes a first area for receiving the air flow produced by the fan motor and a second area unaffected by the air flow, and wherein the heat exchange portion and the first component are located in the first area, and the second component is located in the second area.

17. The electric fan apparatus according to claim 1, wherein the controller has a surface for contacting a wall of the fan motor.

18. A connector connection structure comprising:
    a socket connector having a sink for accommodating a male terminal;
    a plug connector for engagement with the socket connector, the plug connector having a sink for accommodating a male terminal; and
    an intermediate terminal for electrically connecting the socket connector male terminal and the plug connector male terminal when the socket connector and the plug connector are engaged with each other, wherein the intermediate terminal includes:
    a metal plate having sides bent inwardly to form channels defining a first female end that is fitted into the male terminal of either one of the connectors and a second female end that is fitted into the male terminal of the other connector;
    the metal plate having ends defining openings of the female ends;
    a guide member extending from at least one of the ends of the metal plate, the guide member being inclined with respect to the metal plate such that the guide member serves to direct the corresponding male terminal into the opening of the corresponding female end; and
    guide surfaces formed on corners of the metal plate, the guide surfaces being substantially opposed to the guide member, wherein the guide surfaces direct the corresponding male terminal into the corresponding female end in cooperation with the guide member.

19. The connector connection structure according to claim 18, wherein the intermediate terminal has a guide defined on at least one of its female ends, the guide being inclined such that the guide directs a male terminal towards a corresponding one of the female ends.

20. An intermediate terminal comprising:
    a metal plate having sides bent inwardly to form channels defining female terminal ends, and wherein the metal plate has ends defining openings of the female terminal ends;

a slit extending transversely across each channel to divide the channel into independent sections;

a guide member extending from at least one of the ends of the metal plate, the guide member being inclined with respect to the metal plate such that the guide member serves to direct a male terminal into the corresponding female terminal end; and guide surfaces formed on corners of the metal plate, the guide surfaces being substantially opposed to the guide member, wherein the guide surfaces direct the male terminal into the corresponding female terminal end in cooperation with the guide member.

* * * * *